United States Patent
Hastings

(10) Patent No.: US 8,011,182 B2
(45) Date of Patent: Sep. 6, 2011

(54) VERTICAL GRAVITY/BUOYANCY POWER GENERATOR

(76) Inventor: Douglas Reynolds Hastings, Point Richmond, CA (US)

( * ) Notice: Subject to any disclaimer, the term of this patent is extended or adjusted under 35 U.S.C. 154(b) by 0 days.

(21) Appl. No.: 12/803,210

(22) Filed: Jun. 22, 2010

(65) Prior Publication Data

US 2011/0179784 A1   Jul. 28, 2011

Related U.S. Application Data

(60) Provisional application No. 61/269,749, filed on Jun. 29, 2009.

(51) Int. Cl.
  *F03B 17/02* (2006.01)
  *F03G 7/08* (2006.01)
(52) U.S. Cl. .......................... 60/496; 290/1 R
(58) Field of Classification Search .................. 60/496, 60/495; 415/916; 290/1 R
  See application file for complete search history.

(56) References Cited

U.S. PATENT DOCUMENTS

| | | | |
|---|---|---|---|
| 212,186 A | 2/1879 | Burwell | |
| 2,135,110 A | 11/1938 | Platt | |
| 3,934,964 A | 1/1976 | Diamond | |
| 4,054,031 A | 10/1977 | Johnson | |
| 4,220,003 A * | 9/1980 | Doi | 60/325 |
| 4,363,212 A | 12/1982 | Everett | |
| 4,726,188 A * | 2/1988 | Woolfolk | 60/496 |
| 4,805,406 A * | 2/1989 | Grsetic | 60/496 |
| 4,981,015 A * | 1/1991 | Simpson | 60/496 |
| 5,555,728 A * | 9/1996 | Welch, Jr. | 60/496 |
| 6,018,947 A * | 2/2000 | DeMarco et al. | 60/496 |
| 6,964,165 B2 * | 11/2005 | Uhl et al. | 60/495 |
| 2008/0264056 A1 * | 10/2008 | Tung | 60/496 |

* cited by examiner

*Primary Examiner* — Thomas Denion
*Assistant Examiner* — Christopher Jetton

(57) ABSTRACT

A power generator utilizing gases and the gravitational force as efficiently as the buoyant force which act on an apparatus in a natural or man-made liquid medium and convert such forces into mechanical energy. The power generator includes methods for a plurality of weighted uniquely configured variable density containers which ascend and descend in a primarily vertical plane and which drive one or more chains, belts or conveyances with rotating sprockets or pulleys on horizontally aligned shafts in primarily a vertical arrangement upon such apparatus. The chains, belts or conveyances driven by the movement of the containers rotate the sprockets or pulleys (FIG. 1) and their associated shafts in both the ascending and descending motion creating mechanical power. Such power can be used to turn electrical generators or other mechanical machines which necessitate such power input.

4 Claims, 5 Drawing Sheets

VERTICAL GRAVITY/BUOYANCY POWER GENERATOR

CROSS REFERENCE TO RELATED APPLICATIONS

This application claims the benefit of Provisional Patent Application Ser. No. 61/269,749, filed Jun. 29, 2009 by the present inventor

FEDERALLY SPONSORED RESEARCH none

SEQUENCE LISTING none

Primary Class: 60/495; 60/496; 60/500

BACKGROUND

The vertical gravity/buoyancy power generator relates to the generation of power by harnessing the gravitational and buoyant forces which act on an apparatus in a liquid medium and converting such forces into mechanical energy. There exists a profound and continued interest around the world in the development of alternative energy from sources that are renewable and do not deplete resources or pollute the environment. Further, in the United States and many net oil importing countries, there is a need to develop and harness local energy resources to reduce dependence on foreign sources of energy, namely oil.

As a consequence, alternative energy exploration and development proceeds apace to harness energy produced by wind, solar, bioenergy, geothermal, and wave/tidal to name the most scrutinized. Providing a reasonable, steady, continuous and sufficient energy from these sources mostly focuses on their use for generating electricity. However, there are issues with each of these alternative energy sources not the least of which is scalability, efficiency, cost, aesthetics, weather, location and day to day variances in local environments.

Present alternative energy problems solutions include planned: large scale wind farms which cost billions of dollars utilizing thousands of acres and stand still on windless days; huge solar panel arrays, whether for electricity or heat that remain ineffective on cloudy or cool days; bioenergy, with ethanol as an example, does not truly result in a net carbon return and is considered a contributor to driving up global food costs, and geothermal installations which can take years to test and develop with no guarantee of successful energy production.

The concept of energy production from water sources and/or buoyancy dates back to the earliest waterwheels and further back to Archimedes exclaiming "Eureka" when finding a method to define principles of buoyancy. However, as will be shown in the Description of Prior Art, not until now has energy production from gravity and buoyancy, acting through an appropriate apparatus, been effectively rendered viable.

Gravity and buoyancy are the essential scientific principles at stake in the vertical gravity/buoyancy power generator. A body in a liquid medium which has a greater density than the liquid it displaces will sink in that medium. Conversely one with a lesser density will rise. For the sake of example, a gallon of common fresh water at a normal temperature, at sea level, has a mass of 8.34 pounds and a volume of 231 cubic inches. Therefore, combining these two concepts, an object which has a mass of say 10 pounds, with a volume of 231 cubic inches will sink in the referenced liquid medium as it is denser than the liquid is displaces and the force of gravity "pulls" it downward. An object which occupies 231 cubic inches with a mass of say 7 pounds will rise in the liquid medium as it is less dense than the liquid it displaces and the buoyant force will "push" it through the liquid medium. Therefore it is not the "weight" of the buckets or pods or containers which must change to be acted on by gravity or buoyancy but their density relative to the liquid medium which must become greater and lesser in the sinking and rising phases.

The vertical gravity/buoyancy power generator utilizes both of these principles by configuring weighted containers which have the purposely designed capacity to have a much greater density than the liquid they displace on the downward, sinking, or gravity phase and a much lower density than the liquid they displace on the upward, rising or buoyant phase. Of particular note, the vertical gravity/buoyancy power generator efficiently utilizes containers which are purposely designed to have a greater density than the liquid they displace and pass through the liquid medium—as the liquid medium passes through them—with minimal friction. As a result, the plurality of the containers, in total, produces a significant amount of power during their descent phase.

The vertical gravity/buoyancy power generator does not require the sun, wind, monopolize massive tracts of land or sea, or redirect scarce food resources. It can operate in almost any environment, can be located directly in the path of existing power grids, can generate distributed electricity for localized consumption, is not offensive to the eye or local environment and can operate around the clock, day and night without fluctuating output or unreliable operation as is the case with both wind and solar power.

DESCRIPTION OF PRIOR ART

U.S. Pat. No. 2,135,110 to Platt exemplifies commonalities found in buoyancy styled energy generators. A series of buckets are mounted to an endless vertically aligned chain which rotates around sprockets which, in turn, rotate shafts. The buckets are pointed, closed on one end and open on the other. They face point down on the descent and are filled with water which rushes into the upper, open end. On their ascent the buckets are filled with air which causes them to rise. The problem in Platt and others is best illustrated by the statement "The buckets thus are lighter during their upward movement than during their downward movement filled with water, and this causes the chain to move and turn the wheels on which it is mounted." In fact, the "buckets" in Platt or any similar configurations are not lighter or heavier at any time during their ascent or descent (providing they do no leave the liquid medium as some configurations show). The mass or weight of the buckets is constant. The only physical property which changes in Platt is the volume of space which the bucket and its injected gas occupy in the ascent. As a result they may have a lesser overall density than the liquid displaced and be "pushed" upward due to the buoyant force.

U.S. Pat. No. 212,186 to Burwell, in some ways similar to Platt, also attempts to utilize the "weight of water" as adding to the downward motion of the buckets. The problem here is that one gallon of water displaces one gallon of water. The net affect, when looking at water as a "weight" alone is that it has a neutral density when immersed in a like liquid.

U.S. Pat. No. 3,934,964 to Diamond shows a plurality of piston-filled cylinders, in hose linked pairs, mounted on an endless chain or rotational member. As the cylinders point downward the weighted piston slides to the bottom of the cylinder expelling air through the hose which flows into its mated cylinder pointing upward whose sliding piston drops thereby filling the cylinder with the same air. This process is supposed to repeat itself as the paired cylinders rotate in a fluid medium. Once again, Diamond is flawed in that it purports to "vary (ing) the weights of the cylinders from less than the weight of the displaced fluid to more than the weight of the displaced fluid whereby the cylinders may selectively rise and fall within the fluid medium". Again, injecting water or air into the cylinders, when immersed in a fluid medium will not change the "weight" or mass of the cylinders causing them to rise or fall. There is not an explanation for the overall density of the cylinders. If, for example, they were made of styrofoam, they would never sink no matter how much like fluid were injected into them. Conversely, if made of iron they would hardly rise without a huge volume of injected gas.

The vertical gravity/buoyancy power generator, in any embodiment or configuration, is superior to Diamond since it allows the containers to change their density offering a more efficient use of energy for that purpose and producing a greater net amount of useable energy.

U.S. Pat. No. 4,054,031 to Johnson calls for collapsible buckets mounted on a vertical belt on a rotating shaft mounted in a tank of water. The buckets are inflated with air at the beginning of their ascent and collapse against the belt during their descent. This model may actually produce some amount of energy. However, Johnson only seeks to capture energy produced by the buoyant force and does not utilize more than 50% of its cycle when merely routing the collapsible buckets through the descent to make them available for inflation and utilization during their ascent.

U.S. Pat. No. 4,363,212 to Everett is somewhat similar to Diamond in that any potential energy it produces is a result of the buoyant force derived from air injected into a series of buckets rotating between two vertically aligned sets of chains, sprockets and shafts in a liquid. While Everett may improve on similar models it only focuses on capturing energy produced during the buoyant phase. Its buckets descend either "filled with water" or by collapsing. Thus, the energy produced in the ascending phase is partially used to move the apparatus through the descending phase.

In Everett and Johnson above, the models are less than 50% efficient since they purposely harvest energy only in the ascent phase of their operations. The present invention, in any embodiment or configuration, is at least twice as efficient since the containers and their sinking mass are used to create energy in their descent and, with their lessened density in their ascent, capitalize on the buoyant force acting thereon.

U.S. Patent #2006/0288698 A1 to Dentler illustrates another notion which is set forth in numerous similar models; that being a liquid filled tank with a rotating means which move buoyant bodies up through the tank, out of the liquid, through a descent phase in a non-liquid medium, then reintroducing the bodies into the lower portion of the liquid tank, in a repetitious cycle. Dentler and similar configurations are inferior in that these models utilize varying methods to reintroduce chain-linked, buoyant bodies into the lower portion of a liquid filled tank. In the end they all produce energy robbing friction, slow the rotation of the apparatus and introduce engineering, manufacturing and operational complications which are not found in the present invention.

U.S. Pat. No. 4,683,720 to DeShon illustrates a "buoyancy engine" comprising pistons and cylinders immersed in a vessel of liquid. The pistons are raised by injected air and connected to a crankshaft. The pistons have ring sets which seal the cylinder above and below the ring sets (and exert power robbing friction) to provide a compression seal for the injected air. The most obvious advantage the present invention has over DeShon is that compression of either air or water or both is not an issue. In DeShon the pistons must push and pull water out of their way or to fill a void as they rise and fall. This is similar to the compression issue found in an internal combustion engine. These engines lose much power while compressing their air gas mixture prior to ignition and sucking a new volume of the air gas mixture into their cylinders prior to compression. If not for the significant explosive nature of the fuel, these engines would be totally impotent. One must concede that buoyancy, while powerful if properly harnessed, does not produce the explosive, expansive power of the internal combustion engine. As a consequence, every effort must be made to reduce the power-robbing affects of compression of either the required gasses and liquids and friction produced by the apparatus itself. The DeShon model presents compression and friction elements that are not found in the present invention.

OBJECTIVES AND ADVANTAGES OF THE INVENTION

It is an object of the vertical gravity/buoyancy power generator to provide an efficient, environmentally friendly power generator.

It is another object of the vertical gravity/buoyancy power generator to provide an apparatus to generate power without consuming non-renewable resources and which does not generate pollution.

It is another object of the vertical gravity/buoyancy power generator to provide an apparatus of this character which can be located in almost any location on earth and operate at any time of day or night for generating power and thereby greatly increasing its potential use and application.

It is a further object of the vertical gravity/buoyancy power generator to provide an apparatus of this character that is relatively inexpensive to manufacture and maintain.

The characteristics and advantages of the vertical gravity/buoyancy power generator are further sufficiently referred to in the following detailed description of the accompanying drawings, which represent several embodiments.

After considering this example, persons skilled in the art will understand that many variations may be made without departing from the principles disclosed and I contemplate the employment of any such structure, arrangements or modes of operation that are properly within the scope of the appended claims.

SUMMARY OF THE INVENTION

The vertical gravity/buoyancy power generator apparatus harnesses the gravitational and buoyant forces which act on the apparatus, wholly or partially submersed in a natural or man-made liquid medium, and converts such forces into mechanical energy. The vertical gravity/buoyancy power generator includes methods, systems and devices for a plurality of weighted containers which ascend and descend in a primarily vertical plane and which are attached to or engage with one or more chains, belts or conveyances with rotating sprockets or pulleys and horizontally aligned shafts in primarily a vertical arrangement upon such apparatus such that the movements of the containers generate rotational power to the shafts in a continuous and flowing movement (FIG. 1). In the descent phase the containers are open on both ends (FIG. 5) and have greater density than the volume of liquid they displace causing them to descend freely and efficiently through the liquid medium due to the gravitational force. In the ascent phase the containers are filled by bladders or are closed on their upper end or both ends when, in any embodiment, a volume of gas is introduced such that the overall volume of the containers have a greater overall volume and lesser density than the liquid displaced causing the containers to rise through the liquid medium due to the buoyant force. The chains, belts or conveyances to which the containers are attached or engage rotate the sprockets or pulleys (FIG. 1) and their associated shafts creating mechanical power.

Accordingly several of the objects and advantages of the invention are to provide a means to harness an alternative energy source which is environmentally friendly, can operate without dependence on wind or rivers or the sun, has a constant, non-fluctuating power output, and is simple in construction and easily maintained. Still other objects and advantages will become apparent from a study of the following description and the accompanying drawings.

DESCRIPTION OF THE PREFERRED EMBODIMENT

The vertical gravity/buoyancy power generator apparatus is presented in two embodiments though these should not be construed as limitations on the scope of the invention but, rather, the exemplification of several preferred embodiments thereof.

Figure 1:
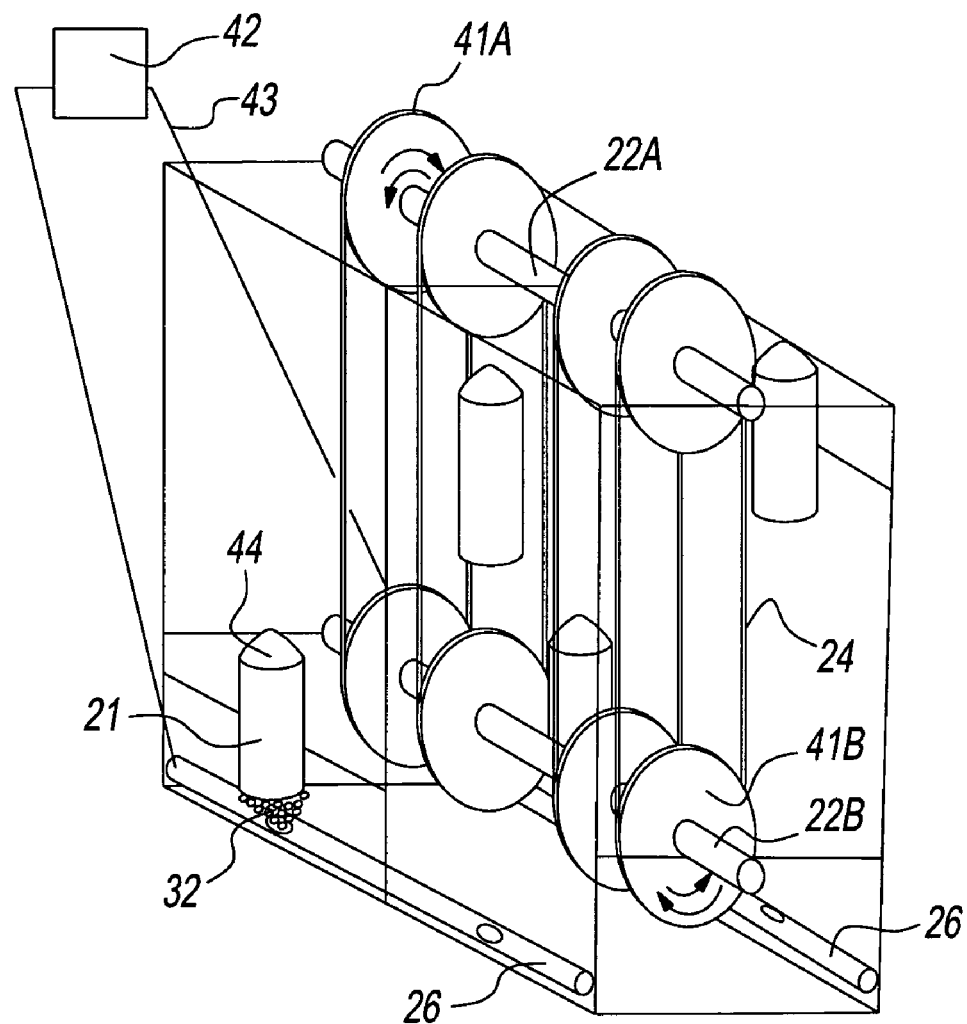
FIG. 1 is a perspective view of the vertical gravity/buoyancy power generator apparatus with a pair of one-way sprockets or pulleys, a pair of chains, belts or conveyances and which has attached a pair of containers. Two sets so configured are shown in the apparatus. The containers are shown with a moveable closure means on one end. The apparatus is illustrated with a gas pump, gas lines and a gas discharge means located near the lower portion of the apparatus.
Figure 3:
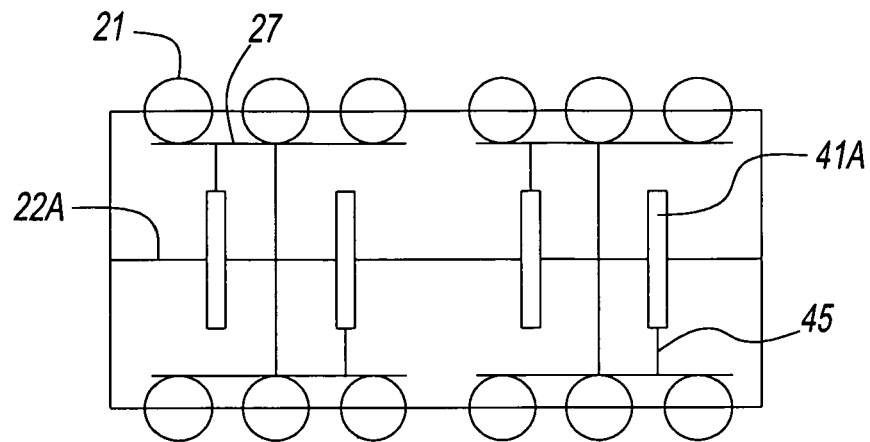
FIG. 3 is a schematic overhead view of the vertical gravity/buoyancy power generator apparatus in FIG. 2 with a pair of one-way sprockets or pulleys driving a pair of chains or belts and which has attached sets of containers. Two sets so configured are shown in the apparatus and illustrate a connecting bracket for the container sets and a bracket connecting the sets with the chains or belts.
Figure 3A:
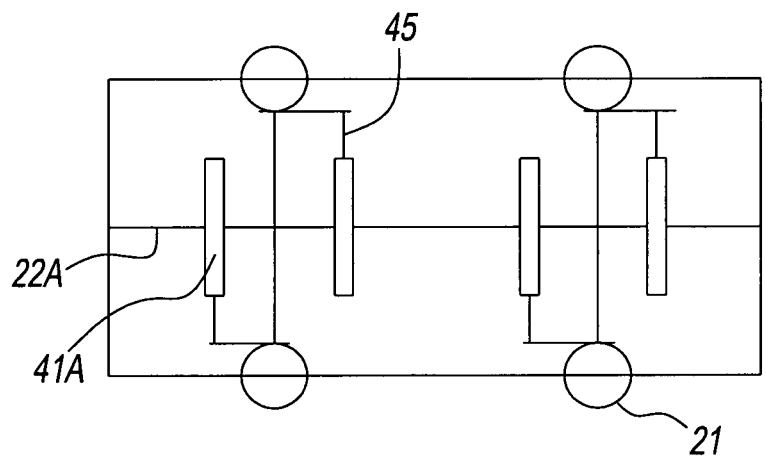
FIG. 3A is a schematic overhead view of the vertical gravity/buoyancy power generator in FIG. 1 with a pair of one-way sprockets or pulleys driving a pair of chains or belts and which have attached a pair of containers. Two sets so configured are shown in the apparatus and illustrate a connecting bracket for the container sets and a bracket connecting the sets with the chains or belts.

FIG. 1 shows the most basic, preferred embodiment for the vertical gravity/buoyancy power generator with two sets of containers (21) operating 90 degrees out of phase with the other set. A configuration for linking the sets is shown in FIG. 3A. An infinite number of container sets is possible with any variety of phasing. In operation the containers (21) ascend and descend through the liquid medium as they are attached by a chain/belt bracket (45) to or engage a chains or belt drives (24) which in turn rotate one way sprockets or pulleys (41A and 41B) which in turn rotate shaft(s) (22A and 22B).

At the bottom of its travel the closure means (44) seals the upper end of the container (21). A volume of gas (32) is introduced by the gas means (26). The apparatus may be fitted with a gas pump (42), gas lines (43) and a gas discharge means (26) located near the lower portion of the apparatus. The gas is introduced into the container has several consequences: it aids the closure means into place, the buoyant pressure of the gas helps hold such in place, and it displaces liquid from the container which results in a greater overall volume of space occupied by the container.

At the top of the cycle the containers release their trapped gas and begin their descent. A movable closure means (44) moves on its hinge or pivot (29) from the opening in the container allowing the liquid to pass through the container as the container sinks through the liquid medium due to the force of gravity. During descent the volume of the container is limited to its actual wall thickness and the volume of the closure means.

This process repeats itself indefinitely for each container and for the cumulative containers located on the vertical gravity/buoyancy power generator apparatus.

As a result of this descending and ascending phases of the containers' movements a chain or belt (24) is driven which, in turn, rotates the one-way sprockets or pulley which, in turn, rotate the upper shaft and, possibly, the lower shaft. This rotational energy may be utilized to drive machines or generators or for other uses.

Referencing the configuration in FIG. 3A it is illustrated that the left container set is attached by the chain/belt bracket (45) to the one-way sprocket or pulley (41A) and hence to the shaft (22A). The use of the paired sets of containers which are attached to or engage with chains or belt drives through one-way sprockets or pulleys benefits the apparatus as follows. The one-way sprockets or pulleys are designed to engage the shaft in one direction only and to free spin in the other. As this set sinks or descends it will transfer power to a single one-way sprocket or pulley. The other one-way sprocket or pulley (41A) associated with that set spins freely as the set of containers descends. Upon the ascent, the previously free spinning one-way sprocket or pulley (41A) now engages while the other one-way sprocket or pulley spins freely. This engineering allows continuous power to be transferred to the shaft while the containers move in their vertical motion ascending and descending. Additionally, continuous power is transferred to the shafts(s) by staggering the phasing of the paired sets in the apparatus so when one paired set is at dead top or dead bottom at least one other set is in its power phase of ascent or descent.

Figure 4:
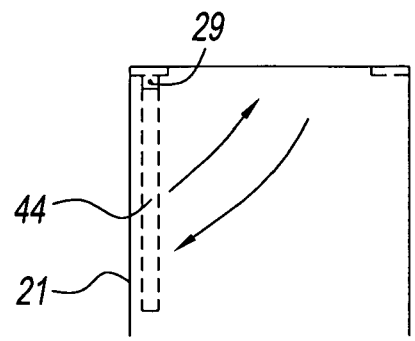
FIG. 4 is an enlarged view of one container in the rising or ascent phase with a movable closure means in the open position. A hinge or pivot is visible as is the motion for the movable closure means showing its travel to the closed position.

The movable closure means (44) claimed for this invention can be configured in a variety of ways including the closure means illustrated in FIG. 4. However the configurations could include, but are not limited to, a bivalve from opposing sides, a bivalve from a center post, a flapper valve, a roll-up closure, an iris closure and the location of such on either or both ends of the containers etc.; each and every one of which are contemplated herein.

Figure 2:
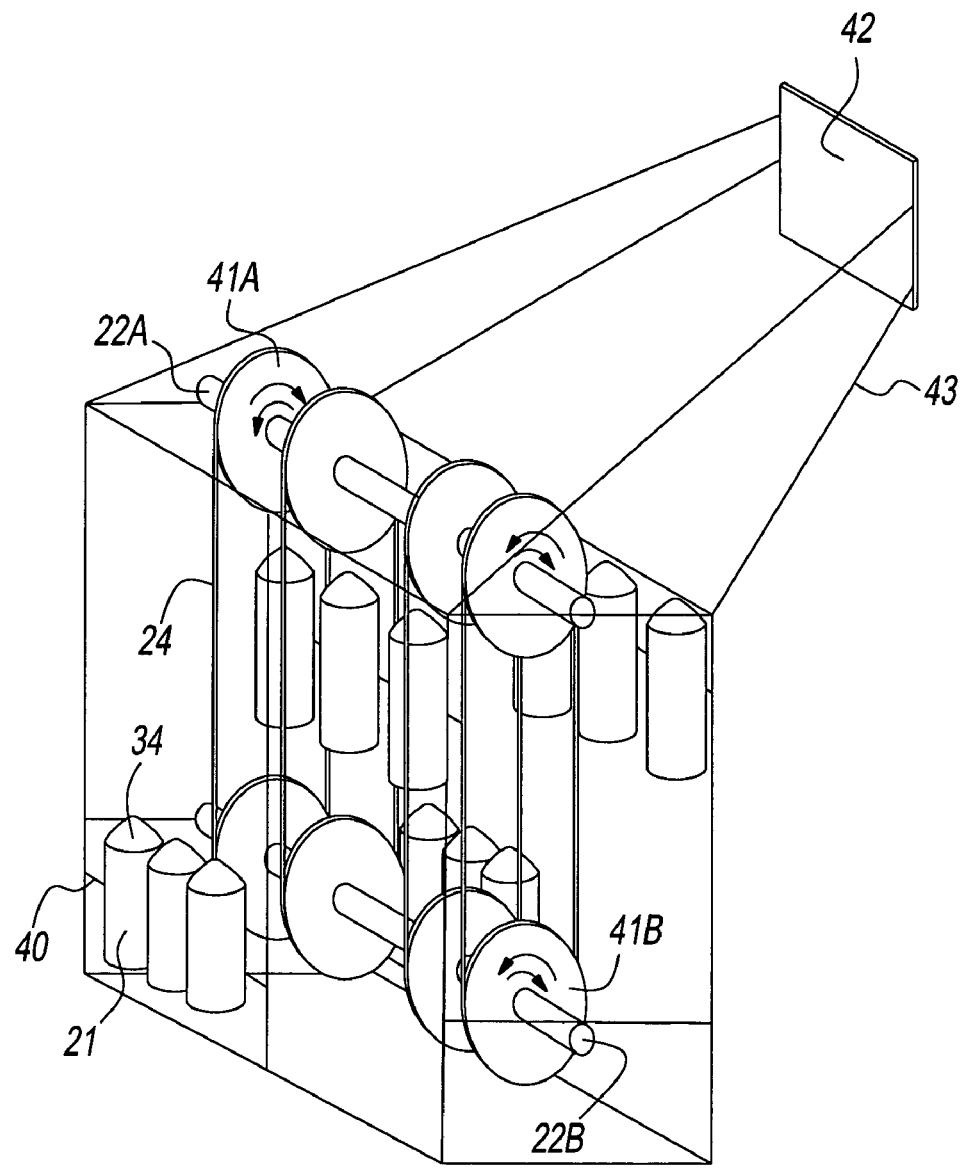
FIG. 2 is a perspective view of the vertical gravity/buoyancy power generator apparatus with a pair of one-way sprockets or pulleys driving a pair of chains or belts and which has attached sets of containers. Two sets so configured are shown in the apparatus. The containers are fitted with bladders. The apparatus is illustrated with a gas pump and gas lines which connect to the upper portion of the apparatus and onward to the containers themselves. The use of gas ports that communicate gas between the gas lines and the bladders is also shown.
Figure 5:
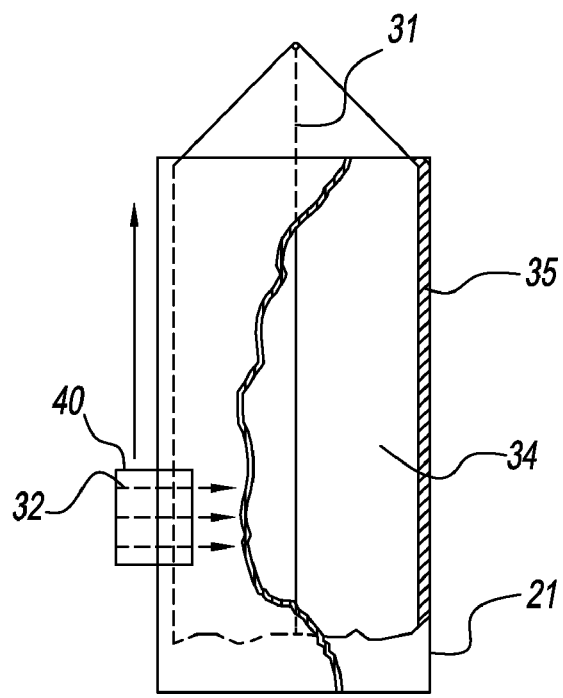
FIG. 5 is an enlarged view of one container with a cutaway so that the inflated bladder is visible within when inflated. A bladder containment cover and a bladder retractor are also visible. The use of gas ports that communicate gas between the gas lines and the bladders is also shown.
Figure 6:
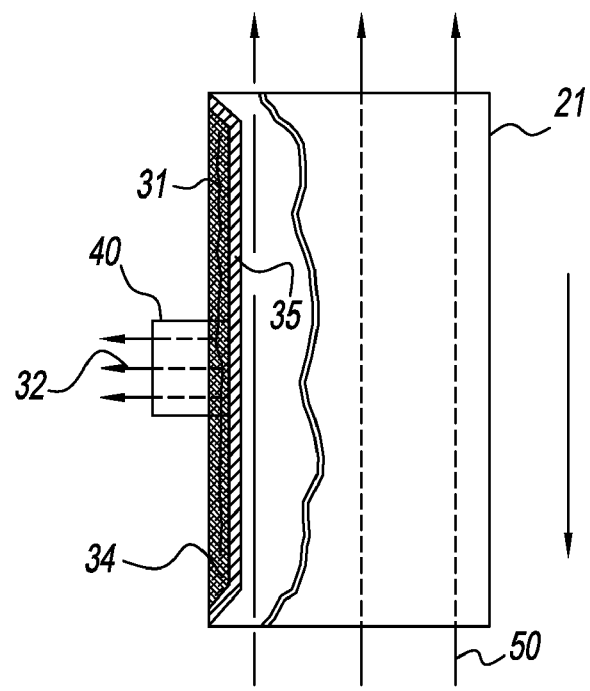
FIG. 6 is an enlarged view of one container with a cutaway so that the deflated bladder is visible within when deflated. The bladder containment cover and the bladder retractor are also visible. The use of gas ports that communicate gas between the gas lines and the bladders is also shown. The flow of the liquid medium through the container with the bladder retracted is shown.
Figure 7:
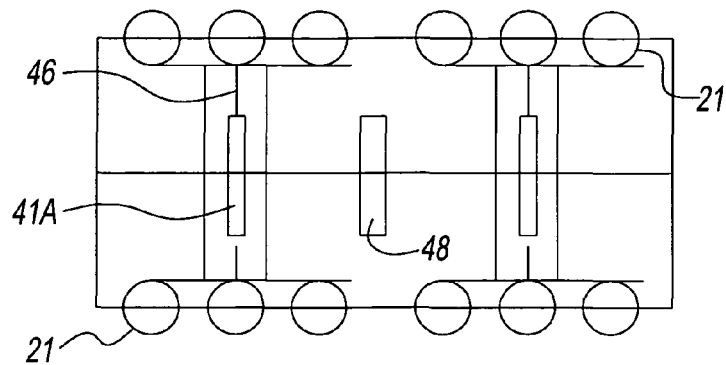
FIG. 7 is a schematic overhead view of the vertical gravity/buoyancy power generator apparatus with a single one-way sprocket or pulley driving a chain or belt and which has sets of containers which are able to connect and disconnect said chain or belt. Two sets so configured are shown in the apparatus and illustrate a chain/belt catch for the container sets and the bracket connecting the sets together. The installation of a flywheel is shown.

FIG. 2 shows the second, preferred, illustrated embodiment. In essence, it operates in a similar fashion as the embodiment shown in FIG. 1 but it has multiple containers arranged horizontally adjacent to each other on a bracket with gas ports (40). The overhead perspective of this configuration is illustrated in FIG. 3. Additionally, each container is fitted with a collapsible gas retention device (34), hereinafter referred to as a bladder, though not limited in its design or function by this term, configured to alternatively hold and release a volume of gas, instead of the closure means (44). The design, installation and use of gas retention devices can have many configurations including, but not limited to, bladders which are internal or external to the container, pod or weight. The bladder, internal in this embodiment, in each container when deflated through gas port (40) during the descending, sinking phase is held against the inside of the container allowing the liquid medium (50) to pass through the container (FIG. 6). Upon beginning or during its ascent the bladder is inflated so that it occupies the internal volume of the container to some degree through the longitudinal axis of the container to some length (FIG. 5). The bladders are alternatively inflated through gas port (40) as the paired sets of containers reach dead bottom and deflated as the paired sets of containers reach dead top in their vertical cycle. The containment means (35) and the bladder retractor (31) are utilized to reduce friction and aid in alignment of the bladder.

The gas discharge means for the bladders may be, though not limited to, the systems shown in FIG. 2 comprised of a double action gas pump (42) connecting gas lines (43) and the bracket with gas ports (40) leading to each container. This system injects gas from the gas pump, through the connecting gas lines and through the bracket with gas ports into the bladders at dead bottom of the descent phase. Conversely it removes gas from the bladders at dead top of the ascent phase. There may also be a cam means which aligns itself to the passing bracket with gas ports (40) but otherwise is mounted to the top and bottom portion of the frame. The source of gas used may include, but is not limited to, a readily available electric gas pump with its own power means, a gas source from industrial application such as waste gas or pressurized air and natural sources such as ocean gas vents.

Figure 8:
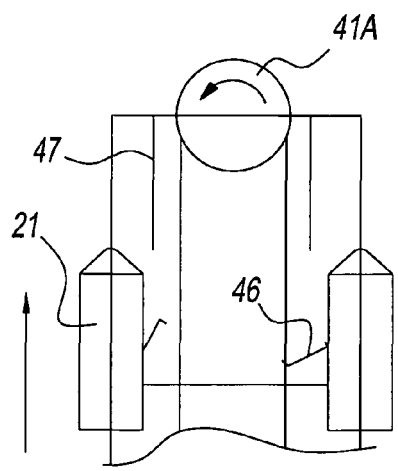
FIG. 8 illustrates a side view of the upper portion of the vertical gravity/buoyancy power generator apparatus showing the upper one-way sprocket or pulley driving the chain or belt and which has a set of containers which are able to connect and disconnect to and from said chains or belts. One set so configured is shown in the apparatus and illustrates the chain/belt catch for the container set. In this figure the set of containers are in the rising or ascent phase and are connected to the chain or belt on one side. The bladders within the container sets are inflated. The other side of the set of containers is disconnected from the chain or belt. A chain/belt catch pushrod is illustrated at the top portion of the apparatus.
Figure 9:
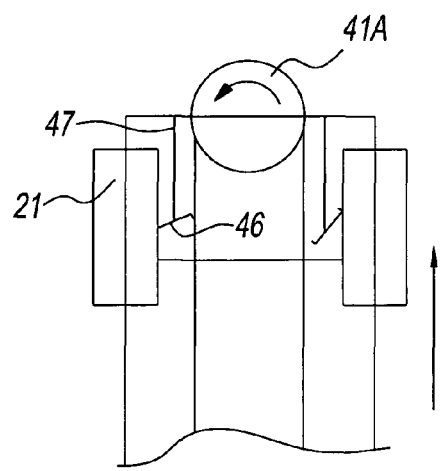
FIG. 9 illustrates a side view of the upper portion of the vertical gravity/buoyancy power generator apparatus showing the upper one-way sprocket or pulley driving the chain or belt and which has a set of containers which are able to connect and disconnect to and from said chain or belt. One set so configured is shown in the apparatus and illustrates the chain/belt catch for the container set. In this figure the set of containers have just reached the top of the rising or ascent phase. One side of the container sets has just been disconnected to the chain or belt by the chain/belt pushrod. The bladders within the container sets have just been deflated. The other side of the set of containers is connected to the chain or belt by the chain/belt catch pushrod which is illustrated at the top portion of the apparatus.
Figure 10:
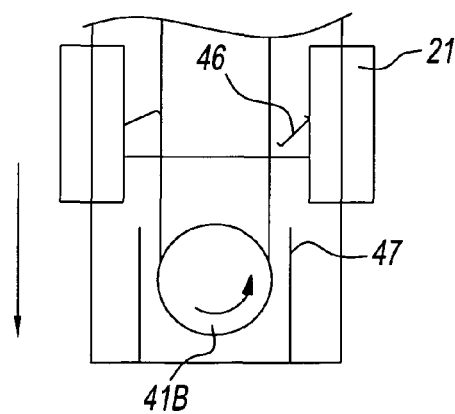
FIG. 10 illustrates a side view of the lower portion of the vertical gravity/buoyancy power generator apparatus showing the lower one-way sprocket or pulley driving a chain or belt and which has a set of containers which are able to connect and disconnect to and from said chain or belt. One set so configured is shown in the apparatus and illustrates the chain/belt catch for the container set. In this figure the set of containers are in the sinking or descent phase and are connected to the chain or belt on one side. The bladders within the container sets are deflated. The other side of the set of containers is disconnected from the chain or belt. The chain/belt catch pushrod is illustrated at the lower portion of the apparatus.
Figure 11:
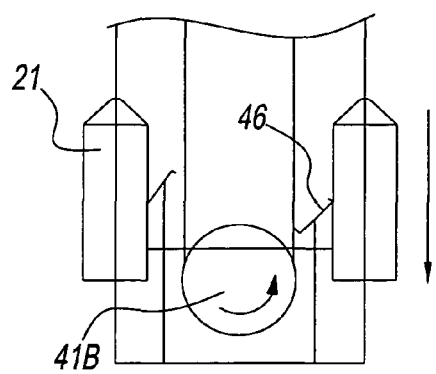
FIG. 11 illustrates a side view of the lower portion of the vertical gravity/buoyancy power generator apparatus showing the lower one-way sprocket or pulley driving a chain or belt and which has a set of containers which are able to connect and disconnect to and from said chain or belt. One set so configured is shown in the apparatus and illustrates the chain/belt catch for the container set. In this figure the set of containers have just reached the bottom of the sinking or descent phase. One side of the container sets has just been disconnected from the chain or belt by the chain/belt pushrod. The bladders within the container sets have just been inflated. The other side of the set of containers is connected to the chain or belt by the chain/belt catch pushrod which is illustrated at the lower portion of the apparatus.

FIGS. 7-11 illustrate an alternate refinement of this embodiment for alternatively attaching and releasing the container (21) sets with the drive chains or belts (24). What is shown is a chain/belt catch (46) that can be moved into or out of contact with the chain or belt by the chain/belt pushrod (47). FIG. 8 shows the chain/belt catch engaged to the chain or belt on one side of the connected container sets as the containers rise or ascend. The chain/belt catch on the other side is not engaged. Upon reaching dead top of the cycle (FIG. 9) one chain/belt catch is disengaged and the other is engaged by the chain/belt pushrods. On the sinking or descending phase power continues to be transferred to the chain or belt by the now engaged chain/belt catch. This process as appropriate for the dead bottom part of the cycle is illustrated in FIG. 10 and FIG. 11.

The containers in either embodiment may be configured on their outer surface with water flow devices to aid in the containers' stability as they move through the liquid medium.

The vertical gravity/buoyancy power generating apparatus in either embodiment may utilize a flywheel (48) on either or both shafts to assist with the smooth rotational operation of the shafts.

Additionally, as mentioned, the vertical gravity/buoyancy power generator, in any embodiment, may be used in industrial facilities where a quantity of gas is produced as a waste or by-product. The facility may be adapted to capture this gas and route such for use as the gas source for this vertical gravity/buoyancy power generator.

What is claimed is:

1. A vertical gravity/buoyancy power generating apparatus for converting the potential energy of gravity and buoyancy acting on an apparatus within a liquid medium into rotational mechanical energy comprising:
   a. the vertical gravity/buoyancy power generator apparatus is immersed wholly or partly in a liquid medium contained in at least one of a tank, a container, or a man made or natural body of water;
   b. a pair of rotatable shafts spaced vertically apart;
   c. fixed means for supporting the shafts in vertical alignment with each other, an upper shaft being relatively located above the other lower shaft;
   d. said shafts are fitted with one-way sprockets or pulleys which rotate said shafts and/or rotate on said shafts; said sprockets or pulleys are designed to engage the shaft in one rotational direction and free wheel in the other rotational direction; the sprockets or pulleys on the opposite shafts are one-way or completely free wheeling;
   e. one or more endless chains, belts or conveyances disposed on the sprockets or pulleys, and at any time a portion of said chain or belt moves vertically upwardly or ascending, and an opposite portion of the chain or belt moves primarily vertically downwardly, or descending;
   f. a plurality of containers which ascend and descend in a primarily vertical plane on a frame apparatus;
   g. said containers have the ability to attach to or engage the chains, belts or conveyances so that the movement of the containers has a motive effect on the chains or belts;
   h. said containers have both vertical ends open on their longitudinal axis so that liquid or gas can pass through the containers;
   i. one or both ends of each container is fitted with a closure means that is capable of an air tight seal when in the closed position so that the closure means closes the upper end of the vertically aligned container when the chains, belts or conveyances are in the ascending phase; said closure means moves freely so that it no longer seals the end of the container thus allowing liquid to pass freely through the container when the chains, belts or conveyances are in the descending phase, and
   j. a gas discharge means for discharging gas into the containers;
   whereby when gas is introduced into the containers sealed by the closure means before the ascent the containers have an overall lesser density than the liquid displaced and rise through the liquid medium due to buoyant force, and the gas is released at the top of the apparatus as the closure means swing open and the containers have an overall greater density than the liquid displaced and descend freely in the liquid medium due to gravity and thereby transmit vertical motive force to the chains, belts or conveyances that is transmitted to the rotating shaft of the apparatus which rotational power can be used for mechanical purposes.

2. A vertical gravity/buoyancy power generating apparatus for converting the potential energy of gravity and buoyancy acting on an apparatus within a liquid medium into rotational mechanical energy comprising:
   a. the vertical gravity/buoyancy power generator apparatus is immersed wholly or partly in a liquid medium contained in at least one of a tank, a container, or a man made or natural body of water;
   b. a pair of rotatable shafts spaced vertically apart;
   c. fixed means for supporting the shafts in vertical alignment with each other, an upper shaft being relatively located above the other lower shaft;
   d. said shafts are fitted with one-way sprockets or pulleys which rotate said shafts and/or rotate on said shafts; said sprockets or pulleys are designed to engage the shaft in one rotational direction and free wheel in the other rotational direction; the sprockets or pulleys on the opposite shafts are one-way or completely free wheeling;
   e. one or more endless chains, belts or conveyances disposed on the sprockets or pulleys, and at any time a portion of said chain or belt moves vertically upwardly or ascending, and an opposite portion of the chain or belt moves primarily vertically downwardly, or descending;
   f. a plurality of containers which ascend and descend in a primarily vertical plane on a frame apparatus;
   g. said containers have the ability to attach to or engage the chains, belts or conveyances so that the movement of the containers has a motive effect on the chains or belts;
   h. said containers have both vertical ends open on their longitudinal axis so that liquid or gas can pass through the containers;
   i. each container is fitted with a bladder configured to alternatively hold and release a volume of gas;
   j. said bladder may be designed with a containment structure which allows the bladder to deflate completely and be held in a relatively fixed manner against the container and, when inflated, conform to and maintain position with the container;
   k. said bladder employs a bladder retractor with elastic properties that aids in alignment of the bladder;
   l. a gas discharge means for discharging gas into the containers, and
   m. one or more gas ports that communicate gas between the gas discharge means and the bladders allowing gas to pass into and from the container and bladder;
   whereby when gas is introduced into the containers sealed by the closure means before the ascent the containers have an overall lesser density than the liquid displaced and rise through the liquid medium due to buoyant force, and the gas is released at the top of the apparatus and the containers have an overall greater density than the liquid displaced and descend freely in the liquid medium due to gravity and thereby transmit vertical motive force to the chains, belts or conveyances that is transmitted to the rotating shaft of the apparatus which rotational power can be used for mechanical purposes.

3. A vertical gravity/buoyancy power generating apparatus in accordance with claim 1 or claim 2 further comprising a facility where a quantity of gas is produced as a waste or by-product and the facility is adapted to capture such gas and route it or use as the gas source for this vertical gravity/buoyancy power generating apparatus.

4. A vertical gravity/buoyancy power generating apparatus in accordance with claim 1 or claim 2 wherein each container or container set includes a valve means coupled between the gas source and a gas port or opening on the container or container set or container bracket, the valve means being adapted to engage a cam means mounted to or proximate to the lower portion of the frame apparatus for reciprocal movement relative to the opening whereby when said valve engages the cam gas can pass through the gas port or opening and into the container; and wherein an additional valve means may be adapted to engage a cam means mounted to or proximate to the upper portion of said frame for reciprocal movement relative to the opening whereby when said valve engages the cam gas can pass through the gas port or opening from the container.

* * * * *